United States Patent
Basil et al.

[11] Patent Number: 6,106,605
[45] Date of Patent: *Aug. 22, 2000

[54] SILICA-FREE UV-ABSORBING ABRASION RESISTANT COATINGS

[75] Inventors: John Darwin Basil, Pittsburgh; Chia-Cheng Lin, Allison Park; Robert Michael Hunia, Kittanning, all of Pa.

[73] Assignee: PPG Industries Ohio, Inc., Cleveland, Ohio

[*] Notice: This patent is subject to a terminal disclaimer.

[21] Appl. No.: 08/898,754

[22] Filed: Jul. 23, 1997

Related U.S. Application Data

[62] Division of application No. 08/491,242, Jun. 16, 1995, Pat. No. 5,693,422, which is a continuation of application No. 08/201,536, Feb. 25, 1994, abandoned, which is a continuation-in-part of application No. 07/591,921, Oct. 2, 1990, Pat. No. 5,385,964.

[51] Int. Cl.[7] .................................................... C09D 5/32
[52] U.S. Cl. ............................ 106/287.12; 106/287.14
[58] Field of Search ........................... 106/287.12, 287.14

[56] References Cited

U.S. PATENT DOCUMENTS

| | | | |
|---|---|---|---|
| 4,275,118 | 6/1981 | Baney et al. | 428/412 |
| 4,299,746 | 11/1981 | Frye | 260/29.2 M |
| 4,390,373 | 6/1983 | White et al. | 106/287.12 |
| 4,395,461 | 7/1983 | Ching | 428/412 |
| 4,405,679 | 9/1983 | Fujioka et al. | 428/216 |
| 4,442,168 | 4/1984 | White et al. | 428/331 |
| 4,477,499 | 10/1984 | Doin et al. | 427/412.1 |
| 4,477,519 | 10/1984 | Frye | 524/440 |
| 4,500,669 | 2/1985 | Ashlock et al. | 524/440 |
| 4,552,936 | 11/1985 | Moore | 525/519 |
| 4,555,537 | 11/1985 | Spector et al. | 524/97 |
| 4,559,271 | 12/1985 | Doin et al. | . |
| 4,571,365 | 2/1986 | Ashlock et al. | 428/412 |
| 4,636,408 | 1/1987 | Anthony et al. | 427/160 |
| 4,754,012 | 6/1988 | Yoldas et al. | 528/10 |
| 4,799,963 | 1/1989 | Basi et al. | 106/287.13 |
| 4,814,017 | 3/1989 | Yoldas et al. | 106/287.12 |
| 5,045,396 | 9/1991 | Lin et al. | 428/412 |
| 5,199,979 | 4/1993 | Lin et al. | 106/287.14 |
| 5,385,964 | 1/1995 | Basil et al. | 524/266 |

*Primary Examiner*—Margaret G. Moore
*Attorney, Agent, or Firm*—Kenneth J. Stachel

[57] ABSTRACT

A silica-free, abrasion resistant and ultraviolet radiation resistant coating is disclosed comprising an organic UV absorbing compound such as hydroxybenzophenone in an inorganic oxide matrix formed by the hydrolysis and condensation of an organo alkoxysilane and a silicon other metal alkoxide.

33 Claims, No Drawings

SILICA-FREE UV-ABSORBING ABRASION RESISTANT COATINGS

This is a division of application Ser. No. 08/491,242 filed Jun. 16, 1995, now U.S. Pat. No. 5,693,477, which is a file wrapper continuation of application Ser. No. 08/201,536 filed Feb. 25, 1994, now abandoned, which is a continuation-in-part of application Ser. No. 07/591,921 filed Oct. 2, 1990, now U.S. Pat. No. 5,385,964.

FIELD OF THE INVENTION

The present invention relates generally to protective coatings for plastics such as polycarbonate, and more particularly to coatings which protect the underlying substrate from damage caused by exposure to ultraviolet radiation.

BACKGROUND OF THE INVENTION

U.S. Pat. No. 4,754,012 to Yoldas discloses a multicomponent composition comprising an organoalkoxysilane with a combination of other components such as hydrolyzable alkoxides of aluminum, titanium, tantalum and hafnium to form an inorganic oxide polymer network providing abrasion resistance and also optimizing other properties such as alkali resistance, adhesive strength, chemical resistance, water stability and index of refraction for optical coatings.

Optical quality abrasion resistant coated plastic materials generally require a coating that protects the substrate from the damaging effects of ultraviolet (UV) radiation. Protection from ultraviolet radiation is especially important for polycarbonate, since hydrolytic degradation is apparently accelerated by UV exposure. Conventional UV stabilizers do not impart sufficient protective capacity to abrasion resistant coatings, as sufficient amounts of most typical organic UV absorbers cannot be added to water/alcohol based sol-gel type abrasion resistant coating compositions due to limited solubility and further without adversely affecting hardness and adhesion of the coating. Moreover, typical UV absorbers may gradually become deactivated after prolonged exposure, and also may gradually be leached from the composition.

SUMMARY OF THE INVENTION

The present invention provides protection for underlying plastic substrates such as polycarbonate from damaging ultraviolet radiation by means of transparent coatings containing ultraviolet absorbing organic compounds in partially hydrolyzed sols of alkoxides of silicon and/or other metals which hydrolyze and polymerize by condensation to form a silica-free film which provides abrasion resistance to the plastic substrate surface. Such ultraviolet radiation (UV) absorbing compounds as hydroxybenzotriazole and hydroxybenzophenone are compatible with alcoholic/aqueous sol-gel compositions and processes, and provide UV protection without compromising abrasion resistance of the inorganic oxide coating. The coatings of the present invention may further comprise an organic film-forming polymer.

DESCRIPTION OF THE PREFERRED EMBODIMENT

Coatings that protect plastic substrates such as polycarbonate from damage caused by ultraviolet radiation are formed from sols containing network-forming alkoxides such as organoalkoxysilanes and other alkoxides. The organoalkoxysilane may be an alkylalkoxysilane or organofunctional alkoxysilane. The alkoxide may contain alkyl or aryl groups and may be in dimer or higher condensed form so long as hydrolyzable alkoxide groups remain. An ultraviolet radiation absorbing organic compound is added to the partially hydrolyzed sol. Hydrolysis and condensation polymerization occur in situ. A preferred catalyst is tetramethyl ammonium hydroxide. Coating compositions are preferably prepared by hydrolyzing an alkyl trialkoxysilane, an epoxy-functional trialkoxysilane or dialkyl dialkoxysilane with an ultraviolet light absorbing compound. Alternatively, the alkoxide may be partially or fully hydrolyzed, and condensed to some extent prior to combination with the organic UV absorber, preferably 2,4-hydroxybenzophenone. An organic film-forming polymer may be added, such as polyvinyl acetate, polyvinyl alcohol, or polyethylene oxide, preferably polyvinylpyrrolidone or a copolymer of polvinylpyrrolidone and polyvinyl acetate.

The resulting composition may be used as a coating composition for either a primer or a protective overcoat on a substrate or coated substrate. In an alternative embodiment, the composition may be added to other coating compositions, such as abrasion resistant coating compositions, to increase their resistance to ultraviolet radiation. In either case, the coating compositions may be applied by any conventional technique, such as spraying, dipping or flow coating. The coating is preferably cured for about 45 minutes to 2 hours at a temperature of about 120 to 130° C. The composition dries and cures to form a uniform durable coating with good adhesion to plastic substrates such as polycarbonate. Preferred coating thickness is about 3 to 6 microns, preferably about 3.4 to 4.5 microns. The coating protects the substrate from ultraviolet radiation by providing strong and broad absorption in the 240 to 380 nanometer range.

In a preferred embodiment of the present invention, an alkoxide is partially hydrolyzed before adding an ultraviolet absorbing organic compound containing hydrophilic extensions with terminal hydroxyl groups capable of reacting with silanol groups. Preferably, the alkoxide is an alkoxysilane of the general formula $R_xSi(OR')_{4-x}$ wherein R is an organic radical, R' is selected from the group consisting of low molecular weight alkyl radicals, and x is less than 4 and may be zero. The organic radical of R is preferably alkyl, vinyl, methoxyethyl, phenyl, 8-glycidoxypropyl, or 8-methacryloxypropyl. The alkoxide hydrolyzes according to the general reaction

Condensation of the Hydrolyzed Alkoxide Proceeds According to the General Reactions

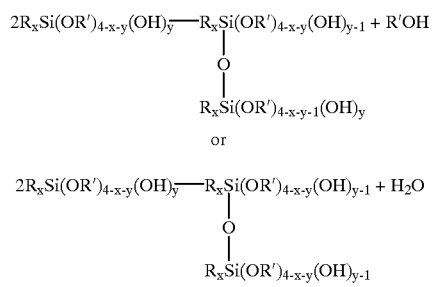

Further Hydrolysis and Condensation Follow.

The pH and/or degree of condensation of the alkoxides may be adjusted, if necessary, to prevent haze or precipitation upon mixing with the organic ultraviolet absorber, preferably 2,4-hydroxybenzophenone. The sol preferably comprises about 0.5 to 5.0 percent by solid weight of the UV absorber. Alkoxides of titanium and/or zirconium may also be included in compositions of the present invention. The ultraviolet radiation protection provided by the 2,4-hydroxybenzophenone containing coating of the present invention may be determined by measuring the UV absorbence spectrum of the coating applied on a quartz substrate.

The silicon alkoxide portion of the composition preferably comprises 1 to 20 percent by weight of a trialkoxysilane $RSi(OR')_3$, where R is preferably a short to medium chain length organic group such as vinyl, phenyl, 3-glycidoxypropyl, or 3-methacryloxypropyl, preferably 3-glycidoxypropyl. The presence of a small amount of trialkoxysilane other than alkyl trialkoxysilane such as $CH_3Si(OR)_3$ is important to the format ion of hydrolytic polycondensation products that provide both the excellent abrasion resistance and hardness of coatings that contain colloidal silica and the excellent flexibility, thermal formability and resistance to cracking during exposure to thermal and mechanical stress that are provided by coatings that use mixtures of alkyl trialkoxysilanes and dialkyl dialkoxysilanes. The latter tend to sacrifice some abrasion resistance and hardness, even with the use of colloidal silica filler.

The use of a mixture of short alkyl- and longer organofunctional trialkoxysilanes results in the following advantages for preparing protective coatings for transparent plastics that are both abrasion resistant and flexible. The polysiloxane network itself provides the abrasion resistant character of the coating. It is not necessary to provide substance to the polysiloxane network by using a "filler" material such as colloidal silica that allows buildup of sufficient film thickness of the siloxane coating to achieve abrasion resistant character without cracking of the film.

Preferred coating compositions in accordance with the present invent ion comprise 28 to 48 percent alkyltrialkoxysilane, preferably methyl trimethoxysilane; 1 to 20 percent organofunctional alkoxysilane, preferably -glycidoxy trimethoxysilane; 20 to 40 percent water; 1 to 3 percent acid, preferably glacial acetic acid; optionally, up to 1 percent organic polymer such as polyethylene oxide, preferably polyvinylpyrrolidone; up to 1 percent ultraviolet light absorber, preferably Uvinul 400, (2,4,-dihydroxyphenyl)phenylmethanoe; up to 0.1 percent curing catalysts such as organic or inorganic acetates, amines, carboxylates, hydroxides or similar basic salts, preferably up to 0.1 percent of sodium acetate and tetramethyl ammonium hydroxide.

In order to coat polycarbonate substrates with abrasion resistant sol-gel compositions of the present invention, preferably an acrylic primer solution is prepared as follows. A solution is prepared from 5 grams of methylmethacrylate/ethylmethacrylate copolymer of 60/40 ratio in warm solvent mixture of 65 grams of propylene glycol methyl ether (or Dowanol PM of Dow Chemicals) and 20 grams of diacetone alcohol. A solution of 0.50 gram Tinuvin 900 and 0.50 gram Tinuvin 1130 UV absorbers in 5 grams of toluene is added to the above resin solution, as taught in copending application Ser. No. 07/275,494 filed Nov. 21, 1988, by Lin et al. entitled "UV Resistant Primer", the disclosure of which is incorporated herein by reference. Primer solutions can be applied by any conventional method such as dip, drain, flow or spray, and are preferably cured for 10 to 20 minutes at about 120° C.

ASTM F735-81 is used to determine the Bayer abrasion resistance of the coating. A 4"×4" coated polycarbonate is subjected to an oscillating silica sand box for 300 cycles of abrasion in 2 minutes. The change in the percentage of haze which is measured by a hazemeter (Hazegard system of Pacific Scientific) is reported. Typically, uncoated polycarbonate has a 55–60% haze increase in this test. Tabor abrasion testing is done in accordance with ASTM D1044 and percent haze after abrasion measured in accordance with ASTM D1003.

The UV resistance of the coating itself as well as its ability to protect an underlying substrate from damage by UV is evaluated by submitting the coated polycarbonates to an accelerated Q-UV chamber equipped with fluorescent tubes (B313 nanometers) manufactured by Q-panel Corporation according to the testing method described in ASTM G53-77. The chamber is programmed for an 8 hour light cycle at 70° C., followed by a 4 hour, 100% condensing cycle at 50° C. The appearance of the coating is inspected, and the discoloration reported in terms of the yellowness index (per ASTM E308-85, 1931 CIE, Illuminant C) using a UV/VIS spectrophotometer. Uncoated polycarbonate typically reaches a value of 10 soon after 100 hours of exposure.

The present invention will be further understood from the descriptions of specific examples which follow.

EXAMPLE I

A solution consisting of 80 grams of methyltrimethoxysilane (Union Carbide A-163), 2 grams of dimethyldiethoxysilane (A-164), 4 grams of glacial acetic acid and 3.0 grams of Uvinul 400 (BASF) is stirred at room temperature until the Uvinul 400 dissolved, and added with stirring to a room-temperature solution of 25 grams of methanol and 55 grams of deionized water. After stirring for 16 hours, the solution is diluted with 20 grams of 2-propanol, 20 grams of 1-butanol, 0.1 gram of BYK-300 flow control agent, and treated with 2 grams of BioRad AG 1-x8 anion exchange resin (hydroxide form) for 3 hours. This raises the sol pH from 3.25 to 4.2. Tetramethylammonium hydroxide, 0.30 gram of 20 percent solution, is added as a cure catalyst, raising the solution pH to 5.1. Stirring at room temperature is continued to develop adhesion to a thermoset acrylic primer containing an additional ultraviolet light absorbing agent.

An acrylic primer solution is prepared by dissolving 60 grams of a 60/40 copolymer of poly(methylmethacrylate-ethylmethacrylate) (Polyscience) in 1082 grams of warm (75° C.) Dowanol PM. The copolymer solution is cooled to room temperature and 360 grams of diacetone alcohol, 86 grams of toluene, 15 drops of BYK-300 (BYK Chemie) and 13.5 grams of Tinuvin 900 are added with stirring until dissolution of the Tinuvin is complete. The resulting solution can be applied to polycarbonate or other plastic substrates by dip coating; for flow or spray application further dilution with Dowanol PM, diacetone alcohol and toluene is necessary to achieve proper thickness (0.5 to 2.0, preferably 1.0 micron).

Primed polycarbonate samples are dip-coated, dried for five minutes in air at ambient temperature and cured for 90 minutes at 130° C. The following table compares the test results of coated and uncoated samples.

TABLE I

| Test | Duration | Measurement | Coated | Uncoated |
| --- | --- | --- | --- | --- |
| Bayer Abrasion | 300 cycles | % Haze | 10 | 55–60 |
| Taber Abrasion | 300 cycles | % Haze | 7–8 | >55 |

TABLE I-continued

| Test | Duration | Measurement | Coated | Uncoated |
| --- | --- | --- | --- | --- |
| QUV-FS-40 | Hours | craze/debond | 900 | 250 (10) |
| QUV-B313 | Hours | craze/debond (yellowness index) | 700 (>5) | 100 (10) |

EXAMPLE II

A solution consisting of 240 grams of methyltrimethoxysilane (Union Carbide A-163), 24 grams of 3-glycidoxypropyltrimethoxysilane (A-187), 12 grams of glacial acetic acid, and 9 grams of Uvinul 400 (BASF) is added to a vigorously stirred solution of 75 grams of methanol and 1.5 grams of polyvinylpyrrolidone, PVP-K90 (mw 300,000), in 165 grams of deionized water at room temperature. Stirring is continued at room temperature for 1 day, after which the solution is treated with a mixture of 75 grams of 2-propanol, 37.5 grams of diacetone alcohol, and 0.6 gram of BYK-300 (BYK Chemie) flow control agent followed by 0.3 gram of Na(OAc)·3H$_2$O. After another five days of stirring, 1.5 grams of 20 percent aqueous tetramethylammonium hydroxide is added. After another two days, the sol is diluted with 15 parts ethyl acetate and 1 gram of BYK-300.

An acrylic primer containing an additional UV light absorbing agent is prepared by dissolving 64 grams of Elvacite 2041 PMMA (DuPont) in 1152 grams of warm (80° C.) Dowanol PM. Upon cooling to room temperature, 13.3 grams of Tinuvin 900 and 5 parts of toluene is added. For flow coating, further dilution with 30 parts of a 3:1 parts by weight mixture of Dowanol PM and diacetone alcohol is required. Polycarbonate samples are dip-coated with an acrylic primer containing an ultraviolet light absorbing agent which is cured for 20 minutes at 120° C. The primed polycarbonate samples are then dip-coated in the silane composition of this example. For flow coating, the sol can be further diluted with 80 parts of a 2:1:1 parts by weight mixture of 2-propanol, diacetone alcohol, and ethyl acetate. Spray application requires further dilution. This coating is cured for 90 minutes at 130° C. Results for coated and uncoated samples are compared in the following table.

TABLE II

| Test | Duration | Measurement | Coated | Uncoated |
| --- | --- | --- | --- | --- |
| Bayer Abrasion | 300 cycles | % Haze | 6 | 55–60 |
| Taber Abrasion | 300 cycles | % Haze | 3–4 | >55 |
| Taber Abrasion | 500 cycles | % Haze | 6–9 | >55 |
| QUV-FS-40 | Hours | craze/debond | 2000 (2) | 250 (10) |
| QUV-B313 | Hours | craze/debond (yellowness index) | 700–800 (>3) | 100 (10) |

EXAMPLE III

A first solution is prepared comprising 80 grams of methyltrimethoxysilane, 8 grams of 3-glycidoxypropyltrimethoxysilane, 4 grams of glacial acetic acid, and 3 grams of Uvinul 400. This solution is added with stirring at room temperature to a second solution of 25 grams of methanol, 50 grams of deionized water, and 12 grams of a 50 percent aqueous solution of a 70/30 ratio vinyl pyrrolidone/vinyl acetate copolymer. Stirring is continued for approximately 16 hours, after which the combined solution is treated with a mixture of 25 grams of 2-propanol, 12.5 grams of diacetone alcohol, 0.1 gram of BYK-300 surfactant, and 0.1 gram of sodium acetate trihydrate. After continued stirring at room temperature for 5 days, 0.5 gram of 25 percent tetramethylammonium hydroxide in methanol is added and stirring continued. Substrates were primed, coated and tested as in the previous examples. The coated samples exhibited 2 to 3 percent haze after 300 cycles of Taber abrasion and excellent steel wool scratch resistance.

EXAMPLE IV

A first solution is prepared comprising 80 grams of methyltrimethoxysilane, 2 grams of dimethyldiethoxyksilane, 4 grams of glacial acetic acid and 3 grams of Uvinul 400. This solution is added with stirring at room temperature to a second solution of 25 grams of methanol, 50 grams of deionized water, and 12 grams of aqueous polyvinylpyrrolidone/polyvinylacetate copolymer solution as in Example III. Stirring is continued for approximately 16 hours, after which the combined solution is treated with a mixture of 25 grams of 2-propanol, 15 grams of diacetone alcohol, 0.1 gram of BYK-300 surfactant, and 0.1 gram of sodium acetate trihydrate. After stirring at room temperature for five more days, 0.3 gram of 25 percent tetramethylammonium hydroxide in methanol was added. Substrates were primed, coated and tested as in the previous Examples with similar results.

EXAMPLE V

A first solution is prepared comprising of 80 grams of methyltrimethoxysilane, 8 grams of 3-glycidoxypropyltrimethoxysilane, 4 grams of glacial acetic acid, and 3 grams of Uvinul 400. This solution is added with stirring at room temperature to a second solution of 25 grams of methanol, 55 grams of deionized water, and 6 grams of aqueous polyvinylpyrrolidone/polyvinyl acetate copolymer solution as in the previous examples. Stirring is continued for approximately 22 hours, after which the combined solution is treated with a mixture of 50 grams of 2-propanol, 25 grams of diacetone alcohol, 0.2 gram of BYK-300 surfactant, and 0.1 gram of sodium acetate trihydrate. After continued stirring at room temperature for 6 days, 0.5 gram of 25 percent tetramethylammonium hydroxide in methanol and 0.2 gram of BYK-300 were added and stirring continued. Substrates were primed, coated and tested as in the previous examples with similar results.

The above examples are offered to illustrate the present invention. Various hydrolyzable alkoxides and ultraviolet absorbers such as hydroxybenzophenone and/or hydroxybenzotriazole compositions may be combined in a wide range of proportions and concentrations, so long as there is sufficient alkoxide to form an oxide network and sufficient UV absorber to provide desired improvement in ultraviolet radiation resistance, as measured by the UV absorbence spectrum of the coating on a quartz substrate, without compromising the abrasion resistance of the coating. Various organic film-forming polymers may be included, such as polyvinyl alcohol, polyvinyl acetate and polyethylene oxide. These coatings are useful on a variety of substrates in accordance with the present invention, the scope of which is defined by the following claims.

What is claimed is:

1. A silica-free coating composition for protecting a substrate from ultraviolet radiation and abrasion comprising a reaction product of:

a. a partially hydrolyzed alkoxide selected from compounds of the general formula $R_xSi(OR')_{4-x}$ wherein R is an alkyl radical, and x is an integer and is less than 4; and b. an organic compound which absorbs ultraviolet radiation selected from the group consisting of hydroxybenzophenone and hydroxybenzotriazole, where the terminal hydroxyl group is available for reacting with silanol groups, and wherein R' of said partially hydrolyzed alkoxide is an alkyl radical selected from the group consisting of methyl, ethyl, propyl and butyl radicals.

2. A composition according to claim 1, wherein said partially hydrolyzed alkoxide is selected from the group consisting of partially hydrolyzed methyltrimethoxysilane, partially hydrolyzed dimethyldiethoxysilane and mixtures thereof.

3. A composition according to claim 2, wherein said coating further comprises 3-glycidoxypropyltrimethoxysilane.

4. A composition according to claim 3, wherein said coating further comprises an organic polymer selected from the group consisting of polyvinyl acetate, polyvinyl alcohol, polyethylene oxide, polyvinylpyrrolidone and copolymers thereof.

5. A composition according to claim 4, wherein the substrate is polycarbonate.

6. A silica-free coating composition for protecting a substrate from ultraviolet radiation and abrasion comprising a hydrolytic polycondensation reaction product of:

a. a partially hydrolyzed alkoxide selected from compounds of the general formula $R_xSi(OR')_{4-x}$ wherein R is an alkyl radical, and x is an integer and is less than 4;

b. an organoalkoxysilane selected from compounds of the general formula $R_ySi(OR')_{4-y}$ wherein R is an organic radical, and y is an integer and is at least one; and c. an organic compound which absorbs ultraviolet radiation selected from the group consisting of hydroxybenzophenone and hydroxybenzotriazole, where the terminal hydroxyl group is available for reacting with silanol groups, and wherein R' of said partially hydrolyzed alkoxide and R' of said organoalkoxysilane are each independently an alkyl radical selected from the group consisting of methyl, ethyl, propyl and butyl radicals.

7. A composition according to claim 6, wherein said partially hydrolyzed alkoxide is selected from the group consisting of partially hydrolyzed methyltrimethoxysilane, partially hydrolyzed dimethyldiethoxysilane, and mixtures thereof.

8. A composition according to claim 6, wherein said organoalkoxysilane is an organotrimethoxysilane wherein R of said organotrimethoxysilane is selected from the group consisting of vinyl, phenyl, methoxyethyl, 3-glycidoxypropyl and 3-methacryloxypropyl.

9. A composition according to claim 6, wherein said ultraviolet radiation absorbing organic compound is hydroxybenzophenone.

10. A composition according to claim 6, wherein said ultraviolet radiation absorbing compound is 2,4-hydroxybenzophenone.

11. A composition according to claim 6, wherein said composition further comprises an organic polymer selected from the group consisting of polyvinyl acetate, polyvinyl alcohol, polyethylene oxide, polyvinylpyrrolidone and copolymers thereof.

12. A composition according to claim 6, wherein said substrate is polycarbonate.

13. A silica-free optically transparent coating composition for protecting a substrate from ultraviolet radiation consisting essentially of:

a. a partially hydrolyzed alkoxide of the general formula $R_xSi(OR')_{4-x}$ wherein R is an alkyl radical, R' is an alkyl radical, and x is an integer and is less than 4;

b. an organoalkoxysilane of the general formula $R_ySi(OR')_{4-y}$ wherein R is an organic radical, R' is an alkyl radical and y is an integer and is at least one; wherein R' of said partially hydrolyzed alkoxide and R' of said organoalkoxysilane are each independently an alkyl radical selected from the group consisting of methyl, ethyl, propyl and butyl radicals; and c. an organic compound which absorbs ultraviolet radiation containing hydrophilic extensions with terminal hydroxyl groups capable of reacting with silanol groups.

14. A composition according to claim 13, wherein said alkoxide has the general formula $R_xSi(OR')_{4-x}$ and R' is selected from the group consisting of methyl, ethyl, propyl and butyl.

15. A composition according to claim 14, wherein said organoalkoxysilane is a trimethoxysilane and R of said organotrimethoxysilane is selected from the group consisting of vinyl, phenyl, methoxyethyl, 3-glycidoxy, 3-glycidoxypropyl and 3-methacryloxypropyl.

16. A composition according to claim 15, wherein said alkoxide comprises methyl trimethoxysilane.

17. A composition according to claim 15, wherein said organoalkoxysilane comprises 3-glycidoxypropyl trimethoxysilane.

18. A composition according to claim 13, wherein said organic compound comprises a compound selected from the group consisting of hydroxybenzotriazole and hydroxybenzophenone.

19. A composition according to claim 18 to which is added an organic polymer selected from the group consisting of polyvinyl acetate, polyvinyl alcohol, polyethylene oxide, polyvinylpyrrolidone and copolymers thereof.

20. A method of preparing an optically transparent ultraviolet resistant coating composition comprising the steps of:

a. at least partially hydrolyzing an alkoxide of the general formula $R_xSi(OR')_{4-x}$ wherein R is an alkyl radical, R' is an alkyl radical, and x is an integer and is less than 4;

b. adding an organoalkoxysilane of the general formula $R_ySi(OR')_{4-x}$ wherein R is an organic radical, R' is an alkyl radical and y is an integer and is at least one;

wherein R' of said partially hydrolyzed alkoxide and R' of said organoalkoxysilane are each independently an alkyl radical selected from the group consisting of methyl, ethyl, propyl and butyl radicals; and c. adding an organic compound which absorbs ultraviolet radiation containing hydrophilic extensions with terminal hydroxyl groups capable of reacting with silanol groups.

21. A method according to claim 20, wherein said alkoxide has the general formula $R_xSi(OR')_{4-x}$ and R' is selected from the group consisting of methyl, ethyl, propyl and butyl.

22. A method according to claim 21, wherein said organoalkoxysilane is a trimethoxysilane and R is selected from the group consisting of vinyl, phenyl, methoxyethyl, 3-glycidoxy, 3-glycidoxypropyl and 3-methacryloxypropyl.

23. A method according to claim 22, wherein said alkoxide comprises methyl trimethoxysilane.

24. A method according to claim 23, wherein said organoalkoxysilane comprises 3-glycidoxypropyl trimethoxysilane.

25. A method according to claim 20, wherein said hydroxy containing organic compound comprises 2,4-hydroxybenzophenone.

26. A composition according to claim 1, wherein the substrate is coated substrate where the coating is an acrylic primer solution.

27. A composition according to claim 6, wherein alkoxide is alkyltrialkoxysilane present in an amount of 28 to 48 percent, the organic alkoxysilane is present in an amount of 1 to 20 percent, and the organic compound is present in an amount up to 1 percent and the composition further contains:

20 to 40 percent water;

1 to 3 percent acid, and optionally, up to 1 percent organic polymer selected from the group consisting of: polyethylene oxide, and polyvinylpyrrolidone;

up to 0.1 percent curing catalysts selected from the group consisting of: organic and inorganic acetates, amines, carboxylates, hydroxides and basic salts, up to 0.1 percent of sodium acetate, and tetramethyl ammonium hydroxide.

28. A composition according to claim 15, wherein the trialkoxysilane from 1 to 20 percent by weight of the alkoxide portion of the composition.

29. A composition according to claim 19, wherein the polyvinylpyrrolidone copolymer is polyvinylpyrrolidone/polyvinylacetate copolymer.

30. A composition according to claim 1, wherein said hydroxybenzophenone is (2,4, dihydroxyphenyl) phenylmethanone.

31. A composition according to claim 6, wherein said hydroxybenzophenone is (2,4, dihydroxyphenyl) phenylmethanone.

32. A composition according to claim 18, wherein said hydroxybenzophenone is (2,4, dihydroxyphenyl) phenylmethanone.

33. The method according to claim 25, wherein said hydroxybenzophenone is (2,4, dihydroxyphenyl) phenylmethanone.

* * * * *